United States Patent
Loqvist

[11] Patent Number: 5,813,848
[45] Date of Patent: Sep. 29, 1998

[54] DEVICE FOR BOILERS

[76] Inventor: Kaj-Ragnar Loqvist, Regnbågsvägen 40, S-737 43 Fagersta, Sweden

[21] Appl. No.: 715,551
[22] Filed: Sep. 19, 1996
[51] Int. Cl.[6] ....................................................... F23L 7/00
[52] U.S. Cl. ................................................................ 431/116
[58] Field of Search .................................... 431/115, 116, 431/183, 353

[56] References Cited

U.S. PATENT DOCUMENTS

| | | | |
|---|---|---|---|
| 1,699,732 | 1/1929 | Balmat | 431/116 |
| 2,110,209 | 3/1938 | Engels | 431/115 |
| 4,380,429 | 4/1983 | LaHaye et al. | 431/115 |
| 4,575,332 | 3/1986 | Oppenberg et al. | 431/116 |
| 5,350,293 | 9/1994 | Khinkis et al. | 431/116 |

FOREIGN PATENT DOCUMENTS

| | | | |
|---|---|---|---|
| 0510783 | 10/1992 | European Pat. Off. | |
| 2922083 | 12/1980 | Germany | |
| 3017050 | 11/1981 | Germany | |
| 3232971 | 3/1984 | Germany | |
| 3618987 | 12/1987 | Germany | |
| 3636787 | 5/1988 | Germany | 431/116 |
| 4020237 | 1/1992 | Germany | |
| 4201059 | 7/1993 | Germany | |
| 4201060 | 7/1993 | Germany | |
| 0457749 | 1/1989 | Sweden | |
| 8607434 | 12/1986 | WIPO | |

OTHER PUBLICATIONS

Development of a Vaporizing Oil Burner Thermal Research & Engineering Corporation, J.A. Johnson & R.H. Eustis, Sep., 3, 1952, 17 pages.

Primary Examiner—Carroll B. Dority
Attorney, Agent, or Firm—Nils H. Ljungman and Associates

[57] ABSTRACT

A device for an oil burner has a ceramic tube (1) inside which a shorter tube (61) is arranged, so that there is a slot between the tubes. The device stands freely in the combustion room of the boiler, and it is coaxial with an oil burner (66) that is mounted in the boiler room wall. Combustion fumes mixed with fresh air from the fan of the oil burner is sucked into the slot that ends inside the ceramic tube. The oil burner flame in the inner tube (61) heats this inner tube that in turn heats the air that is sucked through the slot and is secondary combustion air. The slot has screw-formed ridges that impart a heavy rotation to the secondary air; a rotation that is counter to the rotation of the primary air of the burner. Since the secondary air is hot and rotates heavily, the final combustion will be very efficient.

12 Claims, 3 Drawing Sheets

DEVICE FOR BOILERS

BACKGROUND OF THE INVENTION

1. Field of the Invention

This invention relates to a device for oil or gas fuel boilers of the kind that comprise a tube inside which the combustion takes place.

2. Background Information

Such devices are known for example from SE-A-457,749, DE-C-3,017,050 and DE-A-3,232,971. As compared with combustion directly in a combustion chamber with cooled walls, the combustion will be much better in a tube of this kind.

OBJECT OF THE INVENTION

It is an object of the invention to improve the combustion further.

SUMMARY OF THE INVENTION

This will be achieved principally by one or more channels for sucking in and preheating secondary air, which are arranged to be heated by the combustion and end in the tube.

It is particularly advantageous to arrange the channels so that they impart a rotation to the secondary air.

One feature of the invention resides broadly in a boiler comprising a water cooled chamber, a tube in the chamber having its both ends open to the chamber, a burner arranged to eject a flame into a first end of the tube, the tube comprising a first portion with a first interior diameter at the first end, a second portion with a greater interior diameter, and channels leading through the first portion for sucking in hot fumes and further preheating them before ejecting them as secondary combustion air at the beginning of the second portion.

Another feature of the invention resides broadly in a boiler characterized in that the channels are arranged to impart a rotation to the secondary combustion air.

Yet another feature of the invention resides broadly in a boiler characterized in that the second portion has means for imparting a rotation to the secondary air.

Yet another feature of the invention resides broadly in a boiler characterized in that the burner ejects a rotating primary air to produce the flame and the second portion has means for imparting a rotation to the secondary air a rotation that is counter to the rotation of the primary air.

Still another feature of the invention resides broadly in a boiler characterized in that the second portion has turbulence imparting means.

Yet another feature of the invention resides broadly in a boiler characterized by means for supplying and preheating fresh air to the channels leading through the first portion so that the fresh air mixes with the hot fumes sucked into the channels.

Still another feature of the invention resides broadly in a boiler characterized in that the means for supplying fresh air comprises a portion arranged to be heated by the radiation from the flame.

BRIEF DESCRIPTION OF THE DRAWINGS

The invention will be described in more detail with reference to the accompanying drawings that show an embodiment of the invention.

DESCRIPTION OF THE PREFERRED EMBODIMENT

Figure 1:
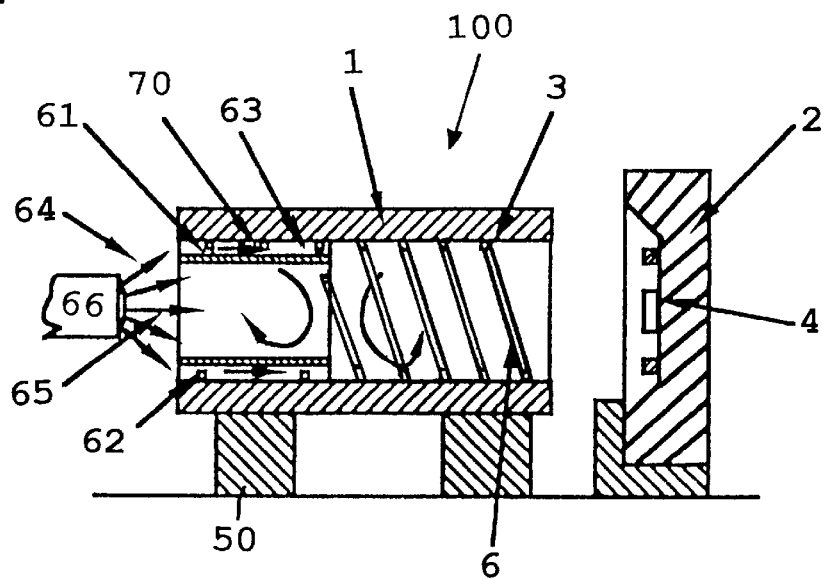
FIG. 1 is the device.

The device 100 in FIG. 1 comprises a tube 1 that suitably can be a ceramic tube. It can also be made of a heat resistant metal. This tube stands on two feet 50 so adapted as to make the tube coaxial with an oil burner 66 that is mounted in the wall of a non-illustrated boiler in the conventional way. The tube 1 is thus freely standing in the cooled combustion chamber of the boiler. Inside the tube 1 there is a shorter tube 61 that can be a tube of a metal alloy that can withstand high temperatures, for example a nickel based alloy. This inner tube 61 is centered in the outer tube by means of screw-formed ridges 70 in the outer tube. The ridges 70 make a number of screw-formed channels of the slot between the tubes and the ridges may continue as turbulence making means 6 outside the mouth of the inner tube 61. A reflector 2, suitably of a ceramic, stands centered against the outlet of the tube 1. The reflector 2 can have turbulence creating means 4, for example buttons or ridges. The reflector will be heated and will reflect the heat back to the flame, which further improves the combustion as compared with a design in which the flame is directed towards a cooled wall. If the reflector is movable as shown, it can be used also to adjust the size of the outlet of the tube 1 and thereby to adjust the pressure in the tube so that the best possible combustion is achieved.

There are different types of oil burners. Most types eject an oil mist 65 mixed with air and this mixture ejects as a heavily rotating cone. This cone is indicated by the arrows 64. A heavily rotating conical flame extends thus into the inner tube 61. A subpressure results from the high velocity of the combustion fumes and causes a suction of secondary air into the slot 62 between the two tubes and this secondary air is taken from the boiler room. It is advantageous that the secondary air is not only fresh air from the oil burner but also consists of hot fumes. The secondary air can suitably comprise of mostly hot fumes. The fresh air can alternatively be supplied through channels that lead to the slot 62. Since the combustion takes place in the inner tube 61, the secondary air will be preheated even more. In contrast to cold secondary air, hot secondary air will mix easily with the flame. The rotation and the turbulence caused by the ridges 6 in the slot 62 will promote this mixture even more if the rotation of the secondary air is counter to the rotation of the flame. Also the part of the ridges that are downstream the outlet of the inner tube 61 will promote the rotation and cause turbulence.

In other words, the device 100 of FIG. 1 comprises a tube or outer tube 1 that suitably can be a ceramic tube. It can also be made of a heat resistant metal. This tube stands on two feet 50 so adapted as to make the tube coaxial with an oil burner 66 that is mounted in the wall of a non-illustrated boiler in the conventional way. The tube 1 is thus freely standing in the cooled combustion chamber of the boiler. Inside the tube 1 there is a shorter inner tube 61 that can be a tube of a metal alloy that can withstand high temperatures, for example a nickel based alloy. This inner tube 61 is centered in the outer tube 1 by means of screw-formed ridges 70 in the outer tube 1. The ridges 70 make a number of screw-formed channels 63 of the slot 62 between the tubes 61, 62 and the ridges 70 may continue as turbulence making means 6 outside the mouth of the inner tube 61.

There are different types of oil burners. Most types eject an oil mist 65 mixed with air and this mixture ejects as a heavily rotating cone, as shown in FIG. 1. This cone is indicated by the arrows 64. A heavily rotating conical flame extends thus into the inner tube 61. A subpressure results from the high velocity of the combustion fumes and causes a suction of secondary air into the slot 62 between the two tubes.

Figure 2:
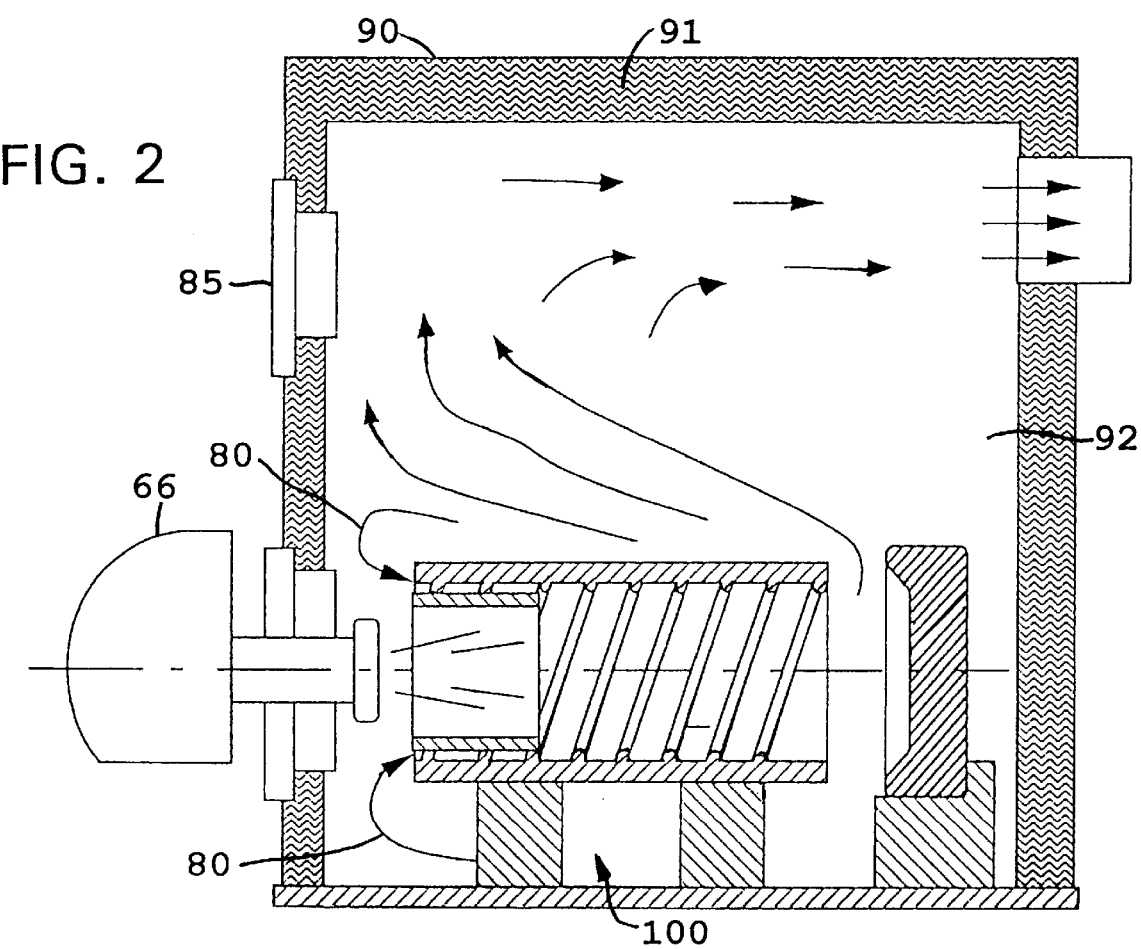
FIG. 2 is a boiler containing the device.

FIG. 2 shows a boiler of older design using the device 100. The walls 90 of the boiler contain water 91, which water 91 is heated and used as a heating medium. The secondary air for combustion is taken from the boiler room 92, as shown by arrows 80 in FIG. 2. It is advantageous that the secondary air is not only fresh air from the oil burner but also consists of hot fumes. The secondary air can suitably be comprised of mostly hot fumes. The fresh air can alternatively be supplied through channels that lead to the slot 62. Since the combustion takes place in the inner tube 61, the secondary air will be preheated even more. In contrast to cold secondary air, hot secondary air will mix easily with the flame. The rotation and the turbulence caused by the ridges 70 in the slot 62 will promote this mixture even more if the rotation of the secondary air is counter to the rotation of the flame. Also the part 6 of the ridges 70 that are downstream of the outlet of the inner tube 61 will promote the rotation and cause turbulence. FIG. 2 also shows an access door 85, shown in the closed position.

Figure 3:
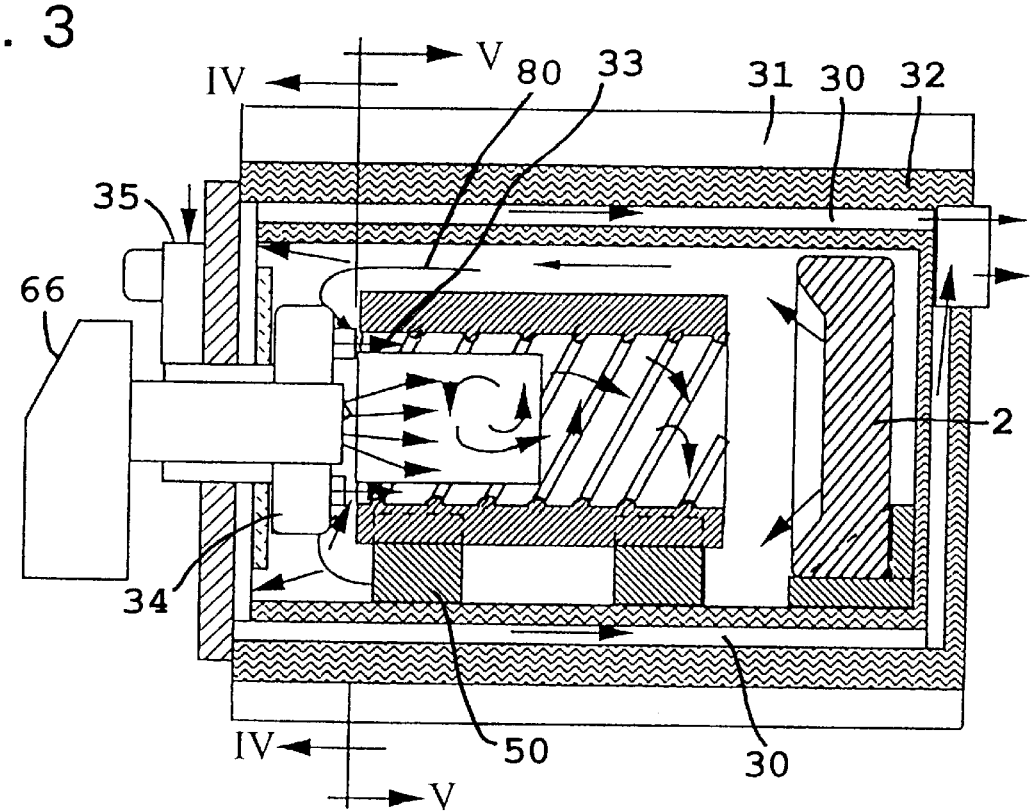
FIG. 3 is a boiler containing the device.
Figure 4:
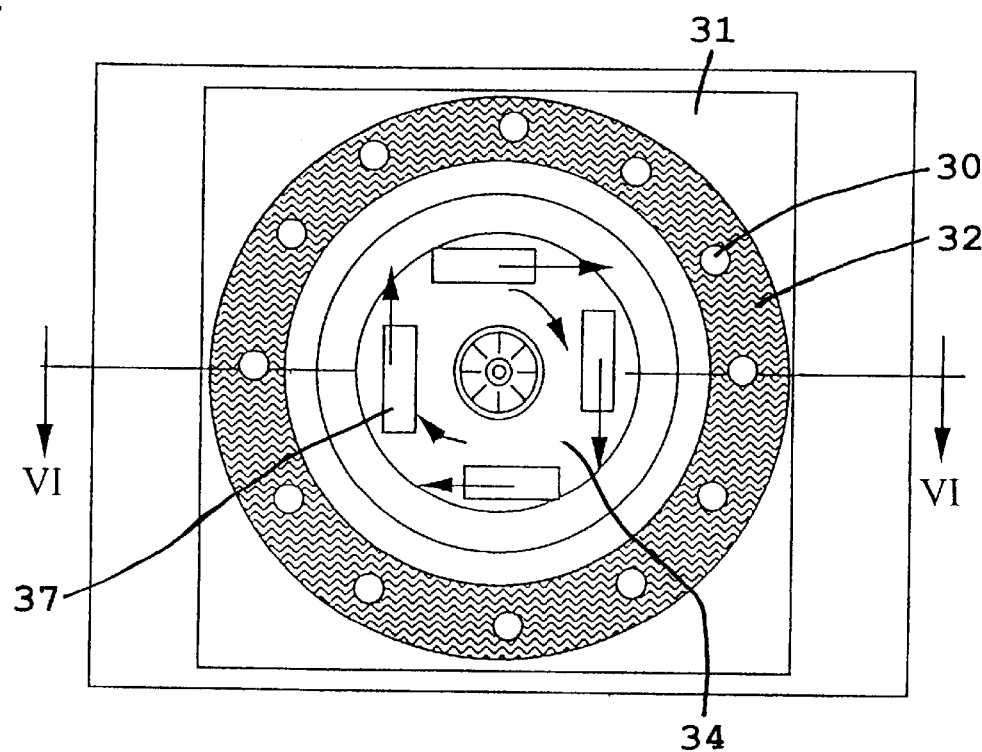
FIG. 4 is a cross sectional view of FIG. 2 along line IV—IV.
Figure 6:
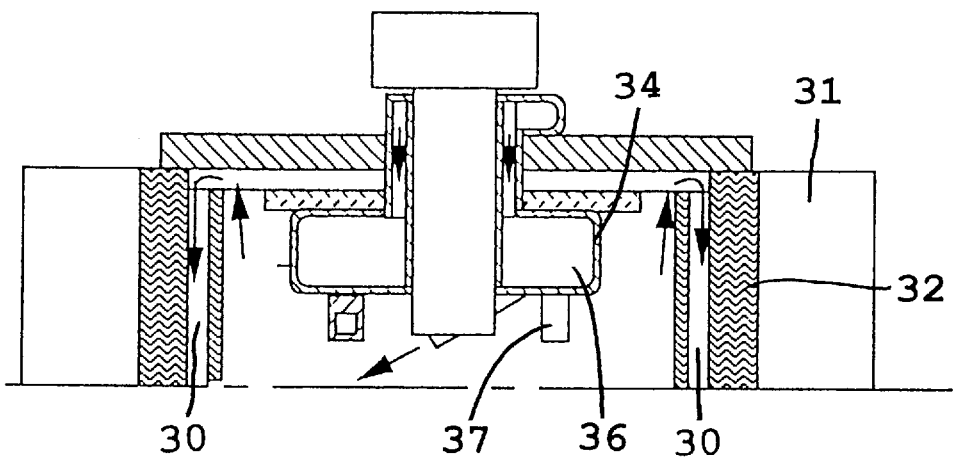
FIG. 6 is a cross sectional view of FIG. 4 along line VI—VI.

FIG. 3 shows a more efficient boiler having walls 31 containing water 32, which boiler has a plurality of passages 30 so that the temperature of the fumes will be low when the fumes leave the boiler. The secondary air includes hot fumes 80 and fresh air 33. The fresh air 33 enters preheater 34 by way of fresh air inlet 35. FIG. 4 shows a view of the burner 66 with the preheater 34. The fresh air preheater 34 has air outlets 37 to supply preheated fresh air to the secondary air. The oil burner 66 may have a rotating portion to which rotating portion the preheater 34 can be connected. Fresh air may thereby be moved through the passages 36 (see FIG. 6) of the preheater 34 by rotating with the burner 66. Alternatively, a fan system can force fresh air through the passage 36 of the preheater 34.

Figure 5:
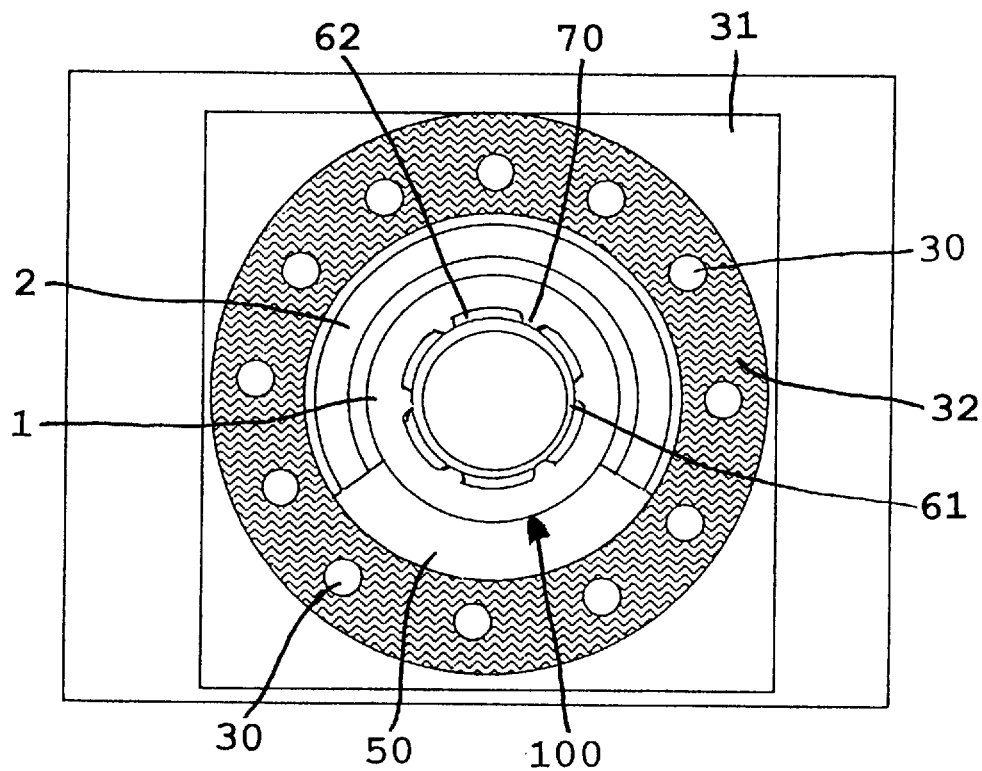
FIG. 5 is a cross sectional view of FIG. 2 along line V—V.

FIG. 5 shows an additional view of device 100. A foot 50 is for supporting the device 100 in the boiler.

In order for the secondary air to be heated enough, the inner tube 61 should have a comparatively good heat conveying ability and it can preferably be made of a metal alloy. It can also be ceramic, but it should then have a thin wall in order to convey heat well.

Instead of having a separate inner tube 61 for making up the channels for the secondary air, the inner and outer tubes can be cast as an integrated unit.

One feature of the invention resides broadly in the device for oil or gas fuel boilers, comprising a tube 1 inside which the combustion takes place, characterized by one or more channels 62 for sucking in secondary combustion air, said channels ending inside the tube 1 and being arranged to be heated by the combustion.

Another feature of the invention resides broadly in the device characterized in that the channels 1 are arranged to impart a rotation to the secondary air.

Yet another feature of the invention resides broadly in the device characterized in that the tube 1 axially has a first portion 61 with a first interior diameter and a second portion with with greater interior diameter, and the channels 62 for secondary air extend axially through said first portion of the tube.

Still another feature of the invention resides broadly in the device characterized in that said second portion has turbulence imparting means 6.

A further feature of the invention resides broadly in the device characterized in that said second portion has means 6 for imparting a rotation to the secondary air.

Another feature of the invention resides broadly in the device characterized in that said second portion has means 6 for imparting a rotation to the secondary air that is counter to the rotation of the primary air.

Yet another feature of the invention resides broadly in the device characterized in that said first portion comprises a short tube 61 inside an outer tube 1 and the slot 62 between the tubes forms the secondary air channels.

Still another feature of the invention resides broadly in the device characterized in that the inlets of the channels 62 are arranged to suck in combustion fumes mixed with fresh air.

Examples of boilers and burners which could possibly be used with the present invention can be found in the following U.S. Patents: U.S. Pat. Nos. 4,142,506; 4,157,698; 4,180,018; 4,196,700; 4,223,205; 4,240,362; 4,263,878; 4,282,833; 4,294,198; 4,296,711; 4,323,051; 4,147,494; 4,154,571; 4,158,386; 4,158,438; 4,175,919; 4,204,832; 4,220,444; 4,295,606; 4,138,986; 4,140,476; 4,162,887; 4,203,719; 4,203,720; 4,237,824; and 4,257,759.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Sweden Patent Application No. 94 01 044.4, filed on Mar. 29, 1994, having inventor Kaj-Ragnar Loqvist, and DE-OS 94 01 044.4 and DE-PS 94 01 044.4 and International Application No. PCT/SE95/00331, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A boiler comprising:

a combustion chamber;

an arrangement to carry heat away from said combustion chamber;

a tube disposed in said combustion chamber;

said tube comprising a first end;

said tube comprising a second end;

a burner disposed to inject a flame into said first end of said tube;

said tube comprising a first portion disposed adjacent to said first end of said tube;

said tube comprising a second portion disposed adjacent said first portion of said tube and away from said first end of said tube;

said first portion of said tube having an interior cross section dimension;

said second portion of said tube having an interior cross section dimension;

said interior cross section dimension of said first portion being less that said interior cross section dimension of said second portion; and said first portion of said tube comprising at least one channel configured to suck hot fumes from said combustion chamber, to further heat the hot fumes sucked from said combustion chamber, and to inject the further heated hot fumes into said second portion of said tube for further combustion upon said burner injecting a flame into said first end of said tube.

2. The boiler according to claim 1, wherein:

said at least one channel comprises a plurality of channels; and said plurality of channels are configured to impart a rotation to the hot fumes.

3. The boiler according to claim 1, wherein:

said second portion of said tube comprises an arrangement for imparting a rotation to the injected hot fumes.

4. The boiler according to claim 2, wherein:

said burner comprises an arrangement to inject rotating air into said tube in a first rotary direction; and said arrangement for imparting a rotation to the injected hot fumes in said second portion of said tube is configured to impart a rotation to the injected hot fumes in a rotary direction opposite to the first rotary direction.

5. The boiler according to claim 1, wherein:

said second portion of said tube comprises an arrangement to create turbulence in gas flowing through said second portion of said tube.

6. The boiler according to claim 1, wherein said boiler comprises:

an arrangement for preheating fresh air and supplying the preheated fresh air to said plurality of channels to mix with the hot fumes sucked into said plurality of channels.

7. The boiler according to claim 6, wherein:

said arrangement for preheating fresh air and supplying the preheated fresh air comprises an arrangement for being heated by radiation from the flame of the burner.

8. The device according to claim 1, wherein:

said tube comprises an outer tube;

said outer tube has a length dimension;

said first portion of said tube comprises an inner tube disposed inside said outer tube;

said inner tube has a length dimension;

the length dimension of said inner tube is less than the length dimension of said outer tube;

said inner tube is dimensioned to form a space between said inner tube and said outer tube; and said space between said inner tube and said outer tube is configured to form said at least one channel.

9. The boiler according to claim 8, wherein:

said at least one channel comprises a plurality of channels; and said plurality of channels are configured to impart a rotation to the hot fumes.

10. The boiler according to claim 9, wherein:

said second portion of said tube comprises an arrangement for imparting a rotation to the injected hot fumes.

11. The boiler according to claim 10, wherein:

said burner comprises an arrangement to inject rotating air into said tube in a first rotary direction; and said arrangement for imparting a rotation to the injected hot fumes in said second portion of said tube is configured to impart a rotation to the injected hot fumes in a rotary direction opposite to the first rotary direction.

12. The boiler according to claim 10, wherein said boiler comprises:

an arrangement for preheating fresh air and supplying the preheated fresh air to said plurality of channels to mix with the hot fumes sucked into said plurality of channels.

* * * * *

UNITED STATES PATENT AND TRADEMARK OFFICE
CERTIFICATE OF CORRECTION

PATENT NO. : 5,813,848
DATED : September 29, 1998
INVENTOR(S) : Kaj-Ragnar LOQVIST It is certified that error appears in the above-identified patent and that said Letters Patent is hereby corrected as shown below:

In column 5, line 38, Claim 3, after 'claim', delete "1," and insert --2,--.

In column 5, line 41, Claim 4, after 'claim', delete "2," and insert --3,--.

In column 5, line 48, Claim 5, after 'claim', delete "1," and insert --4,--.

In column 6, line 1, Claim 6, after 'claim', delete "1," and insert --5,--.

In column 6, line 44, Claim 12, after 'claim', delete "10," and insert --11,--.

Signed and Sealed this

Eighth Day of June, 1999

Q. TODD DICKINSON

Attest:

Attesting Officer

Acting Commissioner of Patents and Trademarks